United States Patent
Shih (10) Patent No.: US 10,875,699 B2
(45) Date of Patent: Dec. 29, 2020

(54) CURLED-EDGE AND DOUBLE-LAYERED CUP, AND METHOD OF MANUFACTURING THE SAME

(71) Applicant: Pack & Proper Co., Ltd., Taoyuan (TW)

(72) Inventor: Kuo Shih, Taoyuan (TW)

(73) Assignee: PACK & PROPER CO., LTD., Taoyuan (TW)

( * ) Notice: Subject to any disclaimer, the term of this patent is extended or adjusted under 35 U.S.C. 154(b) by 0 days.

(21) Appl. No.: 15/902,221

(22) Filed: Feb. 22, 2018

(65) Prior Publication Data

US 2019/0144194 A1 May 16, 2019

(30) Foreign Application Priority Data

Nov. 15, 2017 (TW) .............................. 106139414 A (51) Int. Cl.
*B65D 81/38* (2006.01)
*B31F 1/00* (2006.01)
(Continued)

(52) U.S. Cl.
CPC ........ *B65D 81/3869* (2013.01); *B31F 1/0038* (2013.01); *B31F 1/0041* (2013.01);
(Continued)

(58) Field of Classification Search
CPC .. B65D 81/3869; B65D 3/22; B65D 21/0233; B65D 1/265; B65D 2543/00527;
(Continued)

(56) References Cited

U.S. PATENT DOCUMENTS 2,828,903 A * 4/1958 Adkins .............. B65D 77/0493
229/403
5,145,107 A * 9/1992 Silver ...................... B65D 3/22
229/4.5
(Continued)

FOREIGN PATENT DOCUMENTS

CN 2844015 Y 12/2006

OTHER PUBLICATIONS

Search Report appended to an Office Action issued to Taiwanese counterpart application No. 106139414 by the TIPO dated Feb. 14, 2018.

*Primary Examiner* — Christopher R Demeree
(74) *Attorney, Agent, or Firm* — Hamre, Schumann, Mueller & Larson, P.C.

(57) ABSTRACT

A curled-edge and double-layered cup includes an outer cup unit including an outer base wall, an outer surrounding wall, and an outer top wall, and an inner cup unit disposed within the outer cup unit. The inner cup unit includes an inner base wall disposed above the outer base wall, an inner surrounding wall surrounded by the outer surrounding wall, and a curled-edge unit enclosing the outer top wall. The curled-edge unit includes an inner top wall disposed above the outer top wall, and an outmost surrounding wall having a surrounding portion connected to the inner top wall and surrounding the outer top wall, and a bottom seal portion extending inwardly from the surrounding portion and disposed under the outer top wall.

7 Claims, 6 Drawing Sheets

(51) Int. Cl.
*B65D 21/02* (2006.01)
*B32B 1/02* (2006.01)
*B32B 27/10* (2006.01)
*B32B 27/36* (2006.01)
*B65D 3/22* (2006.01)
*B65D 65/46* (2006.01)
*B65D 77/20* (2006.01)
*B65D 85/804* (2006.01)

(52) U.S. Cl.
CPC ............... *B32B 1/02* (2013.01); *B32B 27/10* (2013.01); *B32B 27/36* (2013.01); *B65D 3/22* (2013.01); *B65D 21/0233* (2013.01); *B65D 65/466* (2013.01); *B65D 77/2024* (2013.01); *B65D 85/8043* (2013.01); *B32B 2439/02* (2013.01)

(58) Field of Classification Search
CPC ..... B65D 81/3865; B31F 1/0038; B32B 1/02; B32B 27/10; B32B 27/36; A47G 19/2288; A47J 41/0072
USPC ...... 229/403, 4.5, 400, 103.11, 122.32, 405; 206/515; 220/592.2, 359.3, 62.11
See application file for complete search history.

(56) References Cited

U.S. PATENT DOCUMENTS

| | | | |
|---|---|---|---|
| 5,524,817 A * | 6/1996 | Meier | B65D 3/22 229/4.5 |
| 5,752,653 A * | 5/1998 | Razzaghi | A47G 23/0216 206/515 |
| 8,875,986 B2 * | 11/2014 | Stahlecker | B65D 81/3869 220/592.2 |
| 10,239,649 B2 * | 3/2019 | Tomioka | B65D 3/22 |
| 2001/0050287 A1 * | 12/2001 | Namba | B65D 81/3865 220/592.17 |
| 2013/0001289 A1 * | 1/2013 | Tedford | B65D 81/3874 229/403 |

* cited by examiner

CURLED-EDGE AND DOUBLE-LAYERED CUP, AND METHOD OF MANUFACTURING THE SAME

CROSS-REFERENCE TO RELATED APPLICATION

This application claims priority of Taiwanese Patent Application No. 106139414, filed on Nov. 15, 201.7.

FIELD

The disclosure relates to a double-layered cup and a method of manufacturing the same, and more particularly to a curled-edge and double-layered cup and a method of manufacturing the curled-edge and double-layered cup.

BACKGROUND

Figure 1:
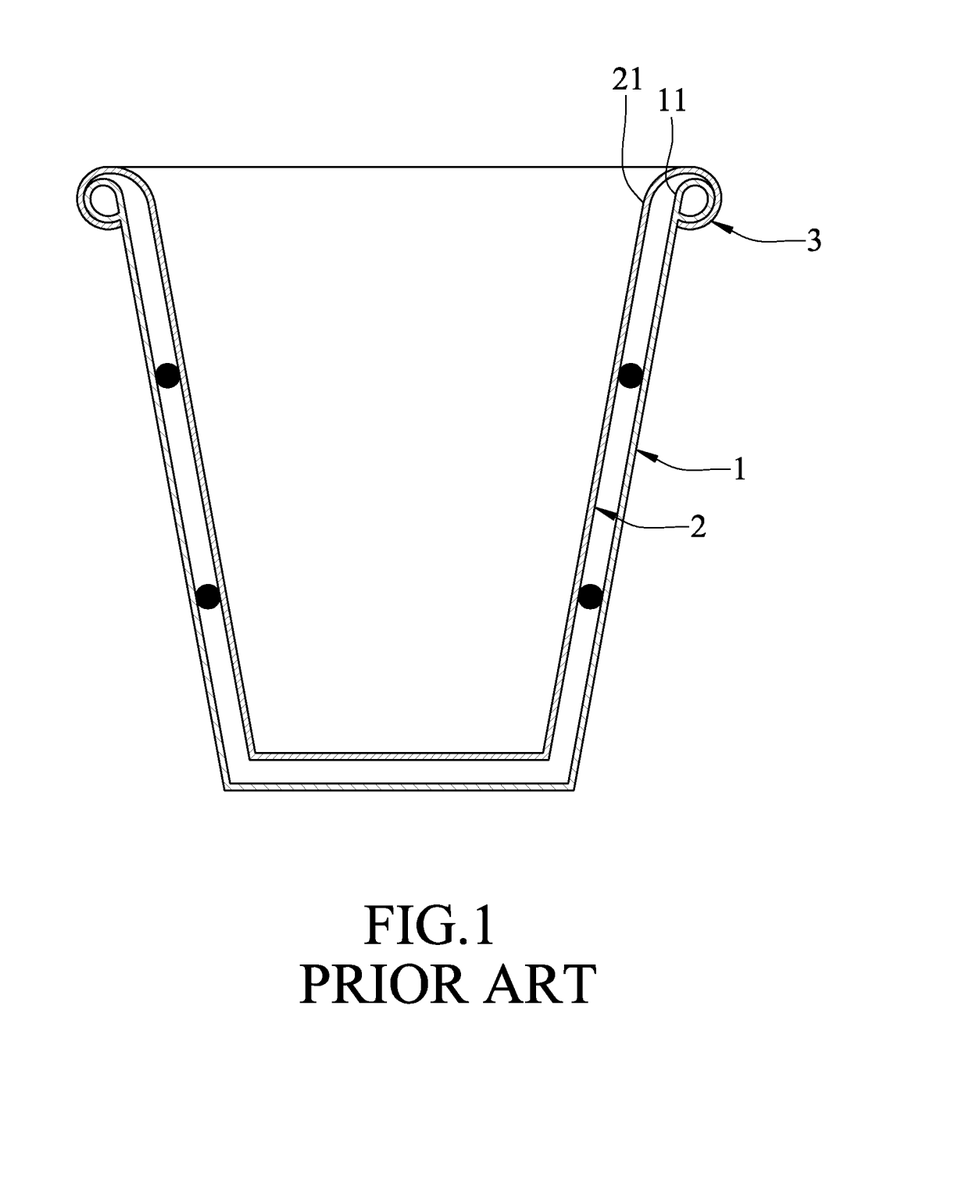
FIG. 1 is a schematic sectional view of a conventional double-layered cup disclosed by Taiwanese Utility Model Patent No. M297913.

FIG. 1 illustrates a conventional double-layered cup disclosed by Taiwanese Utility Model Patent No. M297913. The conventional double-layered cup is made by combining an outer cup unit 1 with an inner cup unit 2. The combination is conducted by inserting the inner cup unit 2 into the outer cup unit 1, followed by curling a top portion 21 of the inner cup unit 2 and a top portion 11 of the outer cup unit 1 together to form a curled-edge portion 3

However, the curled-edge portion 3 of the conventional double-layered cup occupies a substantial amount of space, especially when multiple conventional double-layered cups are stacked together. This would result in the requirement of larger storage space and more package material, and therefore increases overall cost.

SUMMARY

Therefore an object of the present disclosure is to provide a curled edge and double-layered cup and a method of manufacturing the same that can alleviate the drawback associated with the prior art.

According to an aspect of the present disclosure, a method for manufacturing a curled-edge and double-layered cup includes:

manufacturing an outer cup unit, the outer cup unit including an outer base wall, an outer surrounding wall that extends upwardly from an outer periphery of the outer base wall, and an annular outer top wall that extends outwardly from a top end of the outer surrounding wall by a first length;

manufacturing an inner cup unit, the inner cup unit including an inner base wall, an inner surrounding wall that extends upwardly from an outer periphery of the inner base wall, an annular inner top wall that extends outwardly from a top end of the inner surrounding wall by a second length larger than the first length, and an outmost surrounding wall that extends downwardly from an outer periphery of the inner top wall;

inserting the inner cup unit into the outer cup unit, such that the inner base wall is disposed above the outer base wall, the outer surrounding wall surrounds the inner surrounding wall, the inner top wall is disposed above the outer top wall, and the outmost surrounding wall surrounds the outer top wall; and curling the outmost surrounding wall of the inner cup unit, wherein the outmost surrounding wall has a surrounding portion that is connected to an outer periphery of the inner top wall and that surrounds an outer periphery of the outer top wall, and a bottom seal portion that extends inwardly from a lower end of the surrounding portion and that is disposed under the outer top wall, and wherein the inner top wall, the surrounding portion and the bottom seal portion cooperatively constitute a curled-edge unit that encloses the outer top wall of the outer cup unit.

According to another aspect of the present disclosure, a curled-edge and double-layered cup includes an outer cup unit and an inner cup unit.

The outer cup unit includes an outer base wall, an outer surrounding wall that extends upwardly from an outer periphery of the outer base wall, and an annular outer top wall that extends outwardly from a top end of the outer surrounding wall. The inner cup unit is disposed within the outer cup unit, and includes an inner base wall that is disposed above the outer base wall, an inner surrounding wall that extends upwardly from an outer periphery of the inner base wall and that is surrounded by the outer surrounding wall, and a curled-edge unit that is connected to a top end of the inner surrounding wall and that encloses the outer top wall. The curled-edge unit includes an annular inner top wall that extends outwardly from the top end of the inner surrounding wall and is disposed above the outer top wall, and an outmost surrounding wall that s connected to an outer periphery of the inner top wall. The outmost surrounding wall has a surrounding portion that is connected to an outer periphery of the inner top wall and that surrounds an outer periphery of the outer top wall, and a bottom seal portion that extends inwardly from the surrounding portion and that is disposed under the outer top wall.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
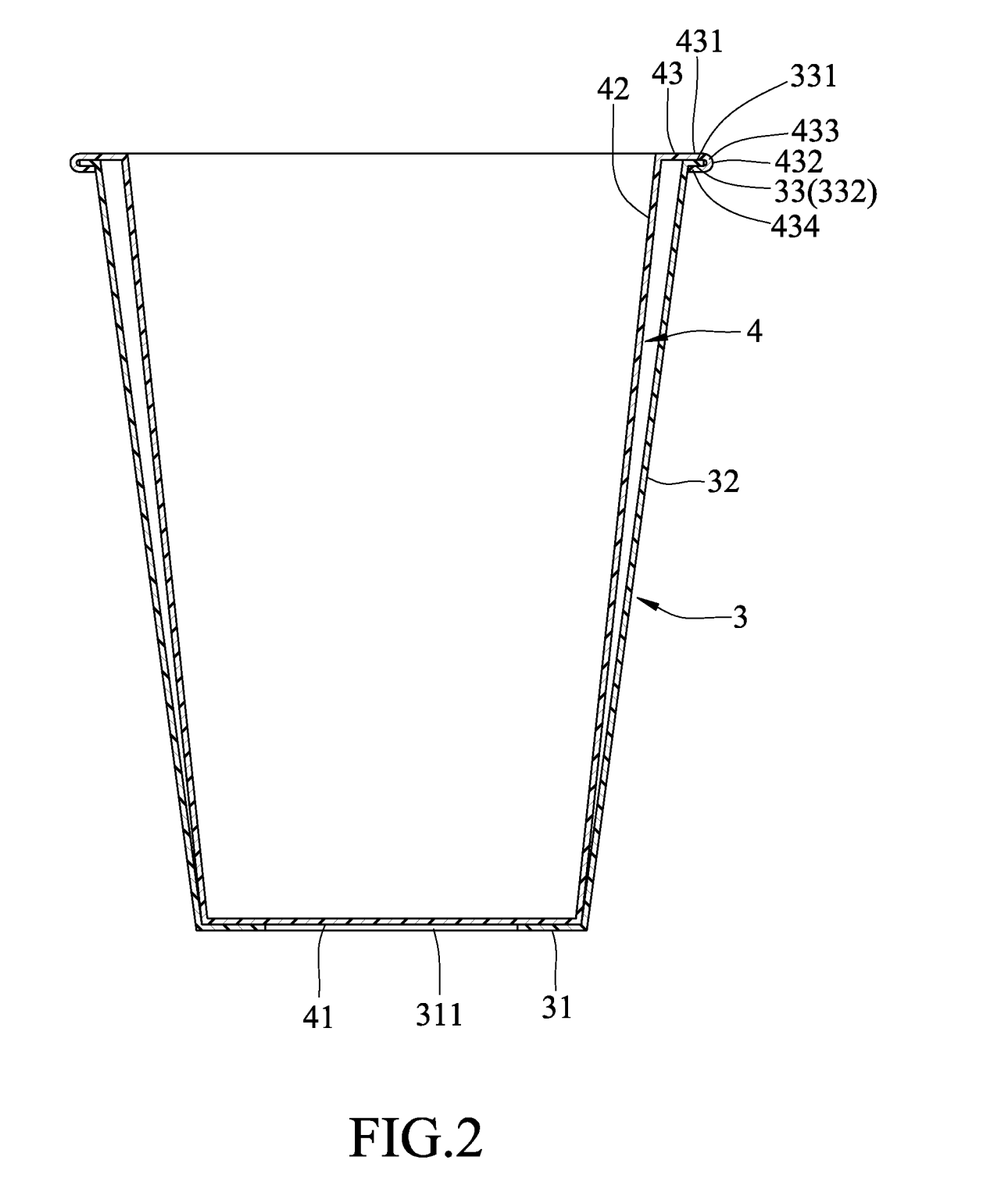
FIG. 2 is a schematic sectional view of a first embodiment of a curled-edge and double-layered cup according to the present disclosure.

Referring to FIG. 2, a first embodiment of a curled-edge and double-layered cup according to the present disclosure includes an outer cup unit 3 and an inner cup unit 4.

The outer cup unit 3 includes an outer base wall 31, a outer surrounding wall 32 that extends upwardly and outwardly from an outer periphery of the outer base wall 31, and an annular outer top wall 33 that extends outwardly from a top end of the outer surrounding wall. In this embodiment, the outer base wall 31 of the outer cup unit has an opening 311. The annular outer top wall 33 has a top surface 331 acing upward, and a bottom surface 332 opposite to the top surface 331 and facing downward. The outer cup unit 3 is made of paper pulp.

The inner cup unit 4 is disposed within the outer cup unit 3, and is connected to the outer cup unit 3. The connection mechanism of the inner cup unit 4 and the outer cup unit 3 will be described later. The inner cup unit 4 includes an inner base wall 41 that s disposed above and abuts against the outer base wall 31, an inner surrounding wall 42 that extends upwardly and outwardly from an outer periphery of the inner base wall 41 and that is surrounded by the outer surrounding wall 32, and a curled-edge unit 43 that is connected to a top end of the inner surrounding wall 42 and that encloses the outer top wall 33. The curled-edge unit 43 includes an annular inner top wall 431 that extends outwardly from the top end of the inner surrounding wall 42 and that is disposed above and abuts against the top surface 331 of the outer top wall 33, and an outmost surrounding wall 432 that is connected to an outer periphery of the inner top wall 431. The outmost surrounding wall 432 has a surrounding portion 433 that is connected to the outer periphery of the inner top wall 431 and that surrounds an outer periphery of the outer top wall 33, and a bottom seal portion 434 that extends inwardly from a lower end of the surrounding portion 433 and that is disposed under the bottom surface 332 of the outer top wall 33. The inner cup unit 4 is made of polylactide aliphatic copolymer (CPLA).

The outer cup unit 3 is adapted for being held by a user. When the culled-edge and double-layered cup contains hot liquid, the user grasping the outer cup unit 3 does not directly touch the inner cup unit 4, and is thus protected from being scalded by the hot liquid. The paper pulp-made outer cup unit 3 also provides heat insulation to the curled-edge and double-layered cup. The CPLA used for making the inner cup unit 4 is not only a safe material for containing food or drink, but also an environment friendly material imposed by the biodegradability of CPLA.

The annular top wall 33 of the outer cup unit 3 is in the form of a flat sheet and is directly enclosed by the curled-edge unit 43 of the inner cup unit 4 without the necessity of curling the annular top wall 33, thereby forming in a curled edge with smaller size, as compared to the above-mentioned conventional double-layered cup. Therefore, the curled-edge and double-layered cup of this disclosure occupies less space, especially when multiple curled-edge and double-layered cups are stacked together. As a result, less storage space and less package material are needed for the curled-edge and double-layered cup of this disclosure.

Figure 3:
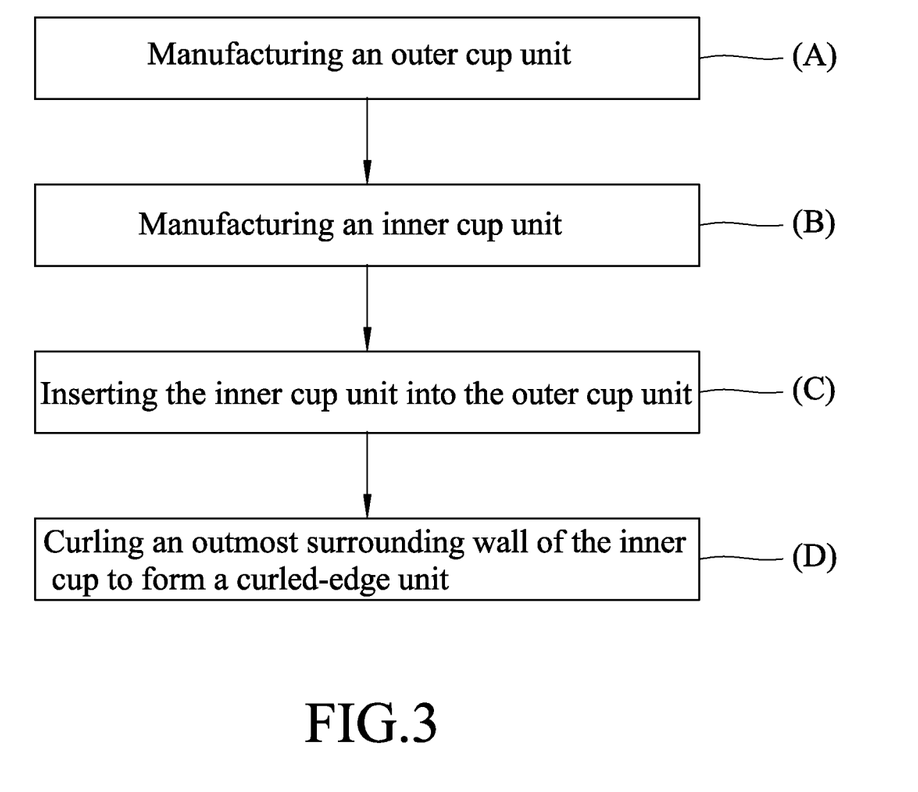
FIG. 3 is a flow chart of a method for manufacturing the first embodiment.
Figure 4:
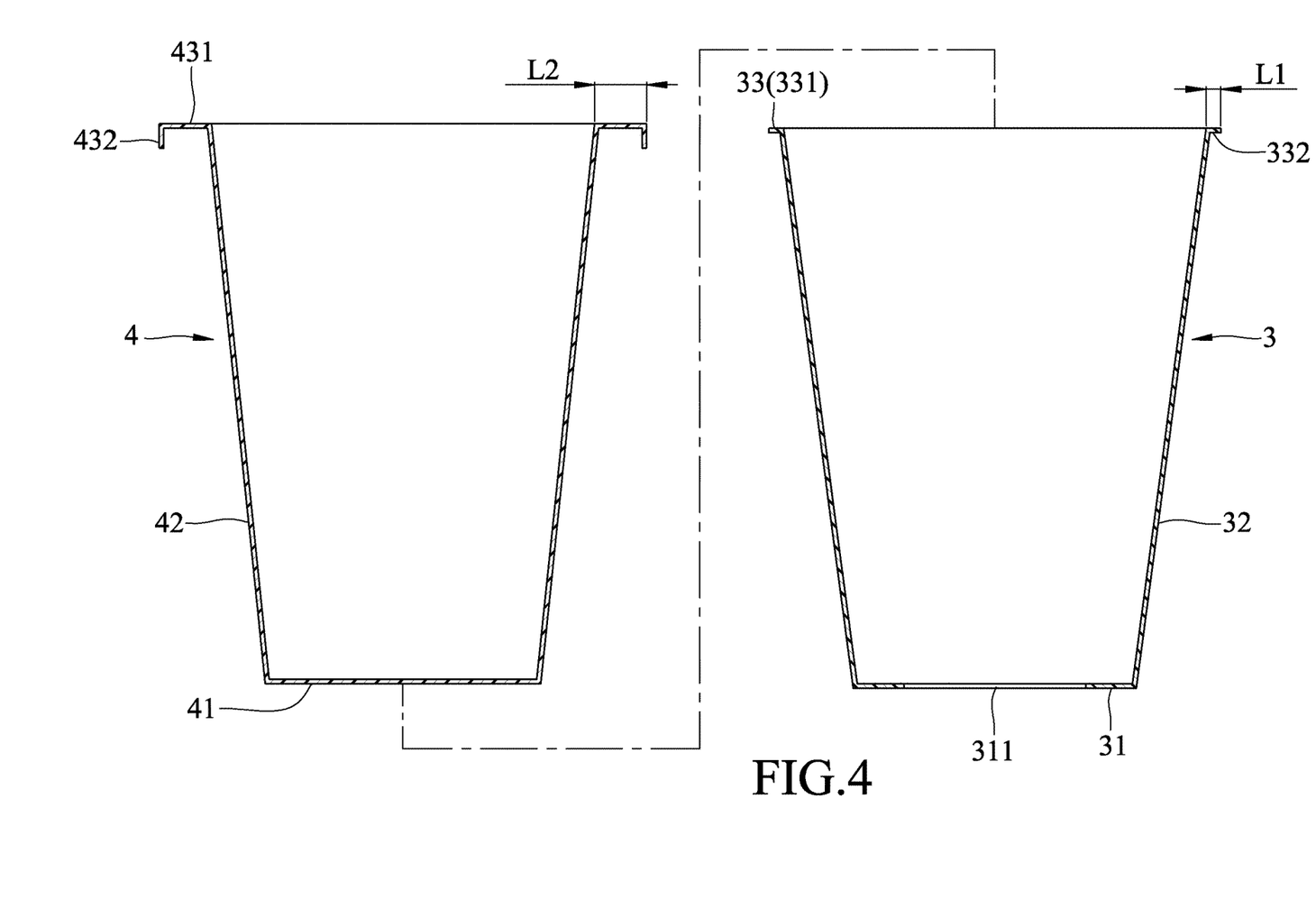
FIG. 4 is a schematic sectional view showing an outer cup unit and an inner cup unit of the first embodiment that are not yet curled.
Figure 5:
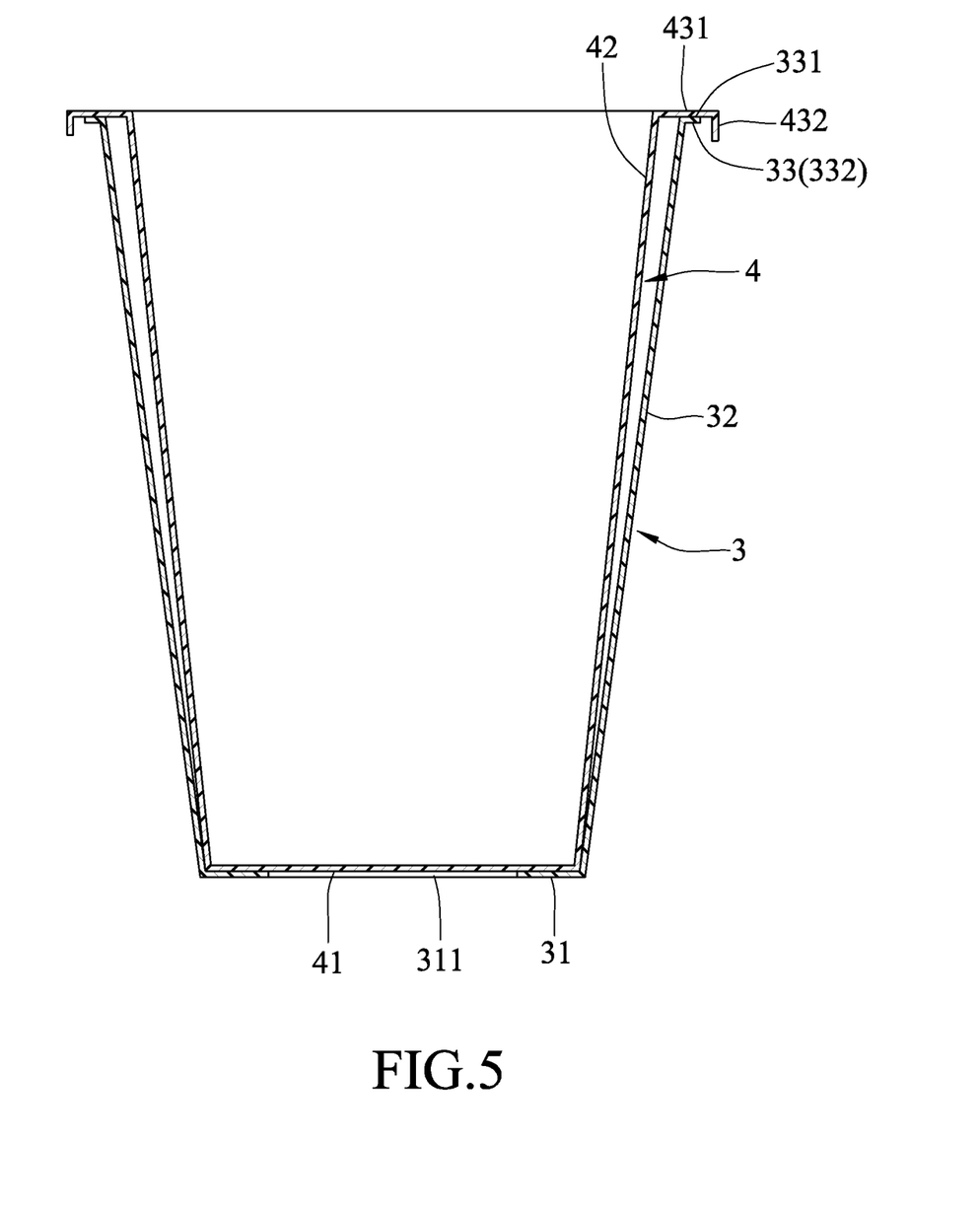
FIG. 5 is a schematic sectional view illustrating that the inner cup unit not yet curled is inserted into the outer cup unit.

FIG. 3 shows a flow chart of a method for manufacturing the first embodiment of the curled-edge and double-layered cup of this disclosure. The method includes the following steps step (A), manufacturing the outer cup unit 3 (see FIG. 4), the outer cup unit 3 including the outer base wall 31 having the opening 311, the outer surrounding wall 32 that extends upwardly and outwardly from the outer periphery of the outer base wall 31, and the annular outer top wall 33 that extends outwardly from the top end of the outer surrounding wall 32 by a first length (L1), the annular outer top wall 33 having the top surface 331 facing upward, and the bottom surface 332 opposite to the top surface 331 and facing downward;

step (B), manufacturing the inner cup unit 4 (see FIG. 4), the inner cup unit 4 including the inner base wall 41, the inner surrounding wall 42 that extends upwardly and outwardly from the outer periphery of the inner base wall 41, the annular inner top wall 431 that extends outwardly from the top end of the inner surrounding wall 42 by a second length (L2) larger than the first length (L1), and the outmost surrounding wall 432 that extends downwardly from the outer periphery of the inner top wall 431;

step (C), inserting the inner cup unit 4 into the outer cup unit 3 (see FIG. 5), such that the inner base wall 41 is disposed above and abuts against the outer base wall 31, the outer surrounding wall 32 surrounds the inner surrounding wall 42, the inner top wall 431 is disposed above and abuts against the top surface 331 of the outer top wall 33, and the outmost surrounding wall 432 surrounds the outer top wall 33;

step (D), curling the outmost surrounding wall 432 of the inner cup unit 4 to convert the structure of the inner cup unit 4 shown in FIG. 5 to that shown in FIG. 2, wherein the outmost surrounding wall 432 is curled to form the surrounding portion 433 that is connected to the outer periphery of the inner top wall 431 and that surrounds the outer periphery of the outer top wall 33, and a bottom seal portion 434 that extends inwardly from the lower end of the surrounding portion 433 and that is disposed under the bottom surface 332 of the outer top wall 33, and wherein the inner top wall 431, the surrounding portion 433 and the bottom seal portion 434 cooperatively constitute the curled-edge unit 43 that encloses the outer top wall 33 of the outer cup unit 3.

By curling the outmost surrounding wall 432 of the inner cup unit 4 to form the curled-edge unit 43 to thereby connect the inner cup unit 4 to the outer cup unit 3, there is no need for an extra adhesive applying step for applying, an adhesive to the outmost surrounding wall 432 to attach the inner cup unit 4 to the outer cup unit 3. Therefore, the manufacturing process is simplified, and the overall cost is reduced.

Figure 6:
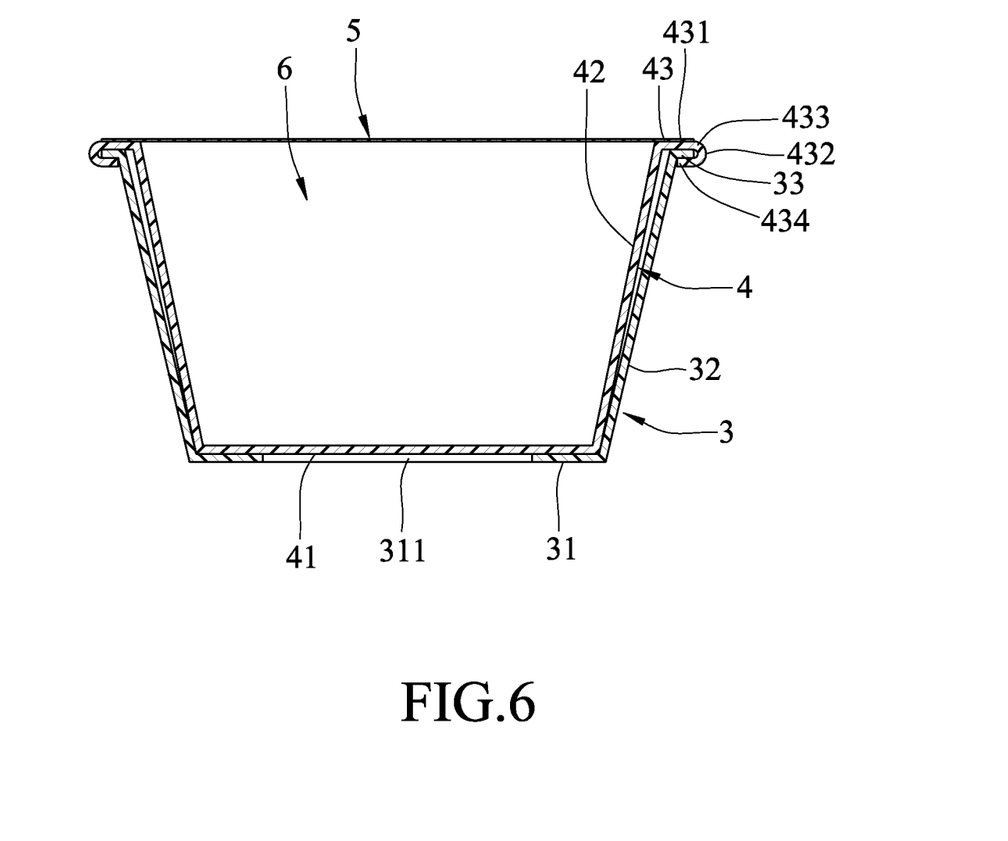
FIG. 6 is a schematic sectional view of a second embodiment of the curled-edge and double-layered cup according to the present disclosure.

Referring to FIG. 6, a second embodiment of the curled-edge and double-layered cup according to the present disclosure has a structure modified from that of the first embodiment. The second embodiment of the curled-edge and double-layered cup further includes a sealing film 5 that is connected to the inner top wall 431 of the inner cup unit 4 and that seals a receiving space 6 defined by the inner cup unit 4.

The second embodiment may be used as a coffee capsule, in which ground coffee and a filter (not shown) are placed into the receiving space 6, followed by sealing the receiving space 6 with the sealing film 5. When in use, the coffee capsule is placed into a coffee capsule machine (not shown), which penetrates the sealing film 5 and a portion of the inner base wall 41 of the inner cup unit 4 corresponding in position to the opening 311 of the outer base wall 31 of the cuter cup unit 3 to form holes. The coffee capsule machine then introduces steam or hot water into the coffee capsule through the penetrated sealing film 5, so that the steam or hot water mixes with the ground coffee. Afterwards, the coffee produced by the mixture of the team or hot water mixes with the ground coffee is filtered by the filter and discharged from the coffee capsule through the holes in the inner base wall 41 of the inner cup unit 4 and the opening 311 of the outer base wall 31 of the outer cup unit 3. It is worth mentioning that the CPLA used for making the inner cup unit 4 has superior airtightness, and can therefore preserve the flavor of the ground coffee contained therein for a longer period of time.

A method for manufacturing the second embodiment of the curled-edge and double-layered cup is similar to that of the first embodiment. The method for manufacturing the second embodiment further includes, after curling the outmost surrounding wall 432 of the inner cup unit 4 (i.e., after the step (D)), attaching the searing film 5 to the inner top wall 431 of the inner cup unit 4 to seal the receiving space 6 defined by the inner cup unit 4.

In summary, the annular top wall 33 of the outer cup unit 3 of the curled-edge and double-layered cup according to the present disclosure is in the form of a flat sheet and is directly enclosed by the curled-edge unit 43 of the inner cup unit 4 without the necessity of curling the annular top wall 33. Therefore, the curled-edge unit 43 of the curled-edge and double-layered cup of this disclosure is smaller in size than the curled-edge portion 3 of the above-mentioned conventional double-layered cup. Therefore, the curled-edge and double-layered cup of this disclosure occupies less space, especially when multiple curled-edge and double-layered cups are stacked together. As a result, less storage space and less package material are needed for the curled-edge and double-layered cup of this disclosure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiment and modifications but is intended to cover various arrangements included within the spirit and scope of the broadest interpretation so as to encompass all such modifications and equivalent arrangements.

What is claimed is:

1. A curled-edge and double-layered cup comprising:
    an outer base wall;
    an outer surrounding wall that extends upwardly from an outer periphery of said outer base wall;
    an annular outer top wall that extends integrally, horizontally, and outwardly from a top end of said outer surrounding wall and that is in the form of a flat sheet;
    an inner base wall that is disposed above said outer base wall;
    an inner surrounding wall that extends upwardly from an outer periphery of said inner base wall and that is surrounded by said outer surrounding wall; and
    a curled-edge unit that is connected to a top end of said inner surrounding wall and that encloses said outer top wall, said curled-edge unit including:
        an annular inner top wall that extends integrally, horizontally, and outwardly from said top end of said inner surrounding wall, that is in the form of a flat sheet, and that is disposed above said outer top wall, and
        an outmost surrounding wall that is connected to an outer periphery of said inner top wall, said outmost surrounding wall having a surrounding portion that is connected to an outer periphery of said inner top wall and that surrounds an outer periphery of said outer top wall, and a bottom seal portion that extends inwardly from said surrounding portion and that is disposed under said outer top wall.

2. The curled-edge and double-layered cup as claimed in claim 1, wherein said outer base wall of said outer cup unit has an opening penetrating therethrough.

3. The curled-edge and double-layered cup as claimed in claim 2, further comprising a sealing film that is connected to said inner top wall and that seals a receiving space defined by said inner base wall and said inner surrounding wall, so that said curled-edge and double-layered cup is able to be used as a coffee capsule.

4. The curled-edge and double-layered cup as claimed in claim 1, wherein said inner base wall and said inner surrounding wall are made of polylactide aliphatic copolymer.

5. The curled-edge and double-layered cup as claimed in claim 1, wherein said outer base wall, said surrounding wall, and said annular outer top wall are made of paper pulp.

6. The curled-edge and double-layered cup as claimed in claim 1, further comprising a sealing film that is connected to said inner top wall and seals a receiving space defined by said inner base wall and said inner surrounding wall.

7. The curled-edge and double-layered cup as claimed in claim 1, wherein said curled-edge unit consists of said annular inner top wall, said surrounding portion of said outmost surrounding wall, and said bottom seal portion of said outmost surrounding wall, said annular inner top wall, said surrounding portion, and said bottom seal portion cooperatively enclosing said outer top wall.

* * * * *